United States Patent [19]
Stange

[11] Patent Number: 5,459,936
[45] Date of Patent: Oct. 24, 1995

[54] PIPE WALL THICKNESS MEASURING TEMPLATE

[75] Inventor: Ronald R. Stange, Greenwood Village, Colo.

[73] Assignee: Tools For Bending, Inc., Denver, Colo.

[21] Appl. No.: 154,588

[22] Filed: Nov. 18, 1993

[51] Int. Cl.[6] .............................. G01B 3/38; G01B 5/06
[52] U.S. Cl. ................. 33/563; 33/501.08; 33/529
[58] Field of Search ......................... 33/563, 562, 529, 33/555.3, 783, 810, 501.05, 501.06, 501.08, 501.45, 199 R

[56] References Cited

U.S. PATENT DOCUMENTS

| | | | |
|---|---|---|---|
| 27,140 | 2/1860 | Maranville | 33/563 |
| 884,821 | 4/1908 | Huhta et al. | |
| 1,389,486 | 8/1921 | Brewer | 33/562 |
| 1,881,651 | 10/1932 | Judge | |
| 2,528,431 | 11/1950 | Greenberg | 33/199 R |
| 3,154,861 | 11/1964 | Rubenstein | |
| 4,150,488 | 4/1979 | Behnke | |
| 4,635,370 | 1/1987 | Beaver | |
| 4,945,649 | 8/1990 | Parker | 33/534 |
| 5,170,570 | 12/1992 | Mays, Jr. | 33/512 |

FOREIGN PATENT DOCUMENTS

| | | | |
|---|---|---|---|
| 17249 | 10/1895 | United Kingdom | 33/501.05 |
| 0480657 | 2/1938 | United Kingdom | 33/501.05 |
| 566043 | 12/1944 | United Kingdom | 33/563 |

*Primary Examiner*—Christopher W. Fulton
*Attorney, Agent, or Firm*—John E. Reilly

[57] ABSTRACT

A pipe wall thickness measuring template has a tapered slot with indicia along opposite edges of the slot and a tapered finger portion, the slot being calibrated to indicate the wall thickness at the point where the pipe wall reaches its maximum penetration into the slot.

10 Claims, 1 Drawing Sheet

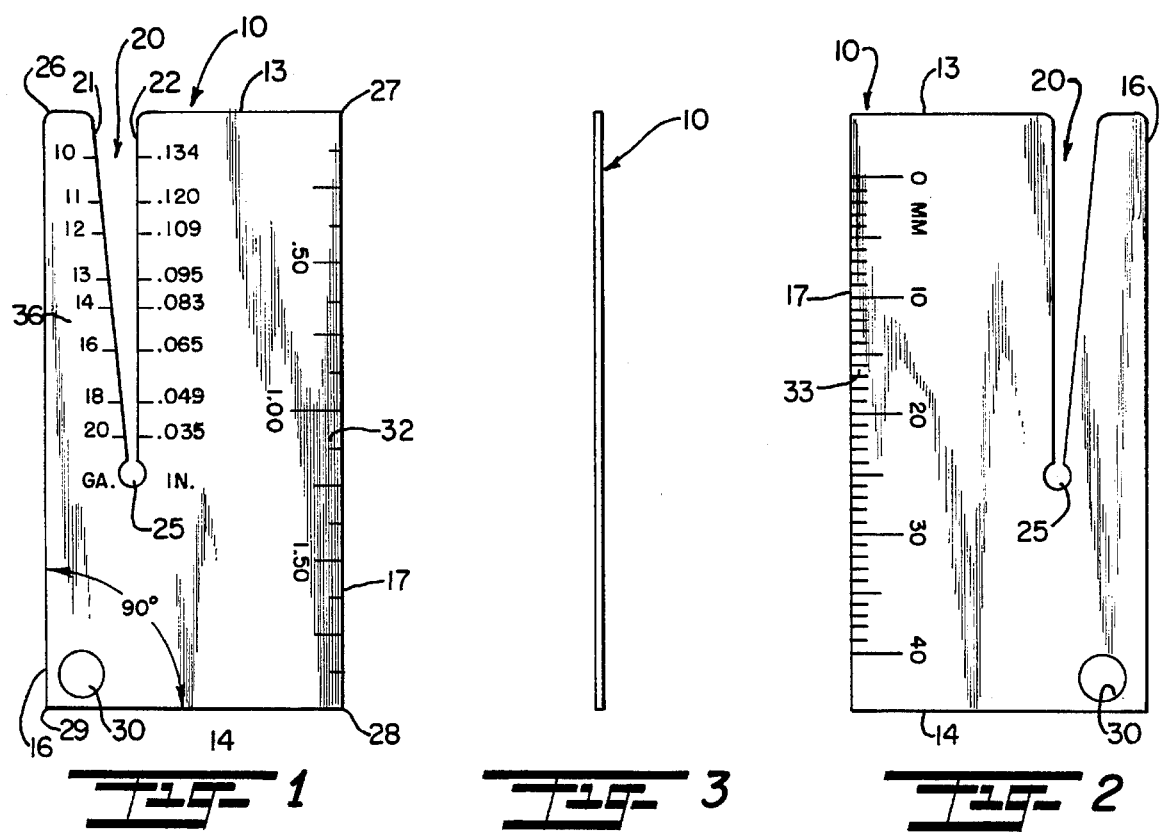

PIPE WALL THICKNESS MEASURING TEMPLATE

SPECIFICATION

This invention relates to measuring devices; and more particularly relates to a novel and improved hand-held measuring template for use in measuring the gauge, or wall thickness, of tubular members and in particular pipes.

BACKGROUND AND FIELD OF INVENTION

A variety of instruments and devices have been devised for use in measuring the gauge or wall thickness of a pipe. On the other hand, various types of templates have been designed for measuring different articles but, to the best of my knowledge, no one has designed an easy-to-use, hand-held template for measuring wall thickness of pipes and other tubular members.

Representative of templates which have been designed for use as measuring instruments include U.S. Pat. No. 5,170,570 to J. H. Mays, Jr. which discloses a gauge having a V-shaped slot for measuring hands, fingers and joints. U.S. Pat. No. 4,945,649 to K. P. Parker discloses an angle gauge for measuring the angular relationship between two surfaces. U.S. Pat. No. 884,821 to J. Huhta et al is directed more to a wire working tool and U.S. Pat. No. 4,635,370 to B. K. Beaver shows a caliper including a gauge and scale. Other patents of interest in this field are U.S. Pat. No. 1,881,651 to F. Judge, U.S. Pat. No. 3,154,861 to J. Rubenstein and U.S. Pat. No. 4,150,488 to E. R. Behnke.

SUMMARY OF INVENTION

It is therefore an object of the present invention to provide for a novel and improved template for measuring wall thickness or gauge of various tubular members, such as, pipes.

Another object of the present invention is to provide for a lightweight, compact, hand-held device which can easily be stored on one's person and readily accessible for use in measuring pipe wall thicknesses of different sized diameters and lengths.

It is a further object of the present invention to provide for a novel and improved template for measuring wall thickness and pipe diameter including indicia on the template in different units of measurement and which is accurate and easy to use.

In accordance with the present invention, a template has been devised for measuring wall thickness of tubular members of different diameters and wall thicknesses and which template comprises a generally rectangular plate having a straight edge and a generally V-shaped, open slot, the slot defining a first inclined edge spaced a predetermined distance from the straight edge so as to define a tapered finger portion which is of minimum width at one end and a maximum width at the opposite end less than the smallest and largest diameters of the tubular members to be measured, respectively. Preferably, the slot has one guide or vertical edge and one inclined edge, the slot tapering from a maximum width greater than the maximum wall thickness of the tubular member to a minimum width less than the minimum wall thickness to be measured. Indicia are provided along both edges of the slot to provide different units of measurement, such as, gauge, English or metric units of measurement. In addition, a rule may be formed along one or more of the straight edges of the template for measuring pipe diameter.

The above and other objects of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a front view in elevation of a preferred form of template in accordance with the present invention;

FIG. 2 is a rear view in elevation of the template shown in FIG. 1; and

FIG. 3 is a side view of the preferred form of template.

DETAILED DESCRIPTION OF PREFERRED EMBODIMENT

A preferred form of template 10 is made up of a generally rectangular, thin flat plate having opposite ends 13 and 14 and opposite sides 16 and 17. An open, generally V-shaped slot 20 has an inclined edge 21 and a reference edge 22 parallel to the sides 16 and 17, the edges 21 and 22 converging from the end 13 in a lengthwise direction with respect to the plate and tapering gradually to terminate in a closed end having a relief arc or cut 25.

In the preferred form, the ends 13 and 14 as well as the sides 16 and 17 are straight edges, the ends 13, 14 being perpendicular at their intersection with the sides to define corners 26, 27, 28 and 29. An aperture 30 is provided in one corner 26 to facilitate attachment to one's person by a chain or cord.

In order to permit standard length or diameter measurements, one side 17 is ruled on one surface 32 with English units in inches and an opposite surface 33 is provided with metric units in millimeters. For example, the straight edge 17 may be used in measuring the diameter of a pipe whose wall thickness is to be determined.

The inclined edge 21 nearest to the straight edge or side 16 is spaced a predetermined distance from the side 16 to define a tapered finger portion 36. This spacing is such as to insure that the finger portion will pass through the interior over a wide range of different sizes or diameters of pipes to be measured. In addition, the edges 21 and 22 of the slot 20 taper from a maximum width greater than the maximum wall thickness of the range of tubular members of pipes to be measured to a minimum width less than the minimum wall thickness of the tubular members of pipes to be measured. Each of the edges 21 and 22 have measuring indicia at spaced intervals therealong which correspond to the width of the slot at that point. Thus, the inclined edge 21 includes gauge measuring indicia and the vertical edge 22 includes inch measuring indicia.

In use, the edge 22 will serve as a reference or guide edge for the outside wall surface of the pipe so that the end of the pipe will remain square to the surface as the finger portion is inserted through the interior of the pipe to a point where the wall thickness will correspond to the width or spacing across the slot and be unable to advance any further. At that point, the measurement may be read off of either edge 21 or 22 in gauge or inches. The template may be made in various lengths and sizes depending upon the range of wall thickness to be measured. For example, however, in the tube bending industry the most common measurements fall in the range of 10 to 20 gauge as marked on the scale in FIG. 1.

It is therefore to be understood that while a preferred form of measuring template has been herein set forth and described, the above and other modifications and changes may be made therein without departing from the spirit and scope of the present invention and as defined by the appended claims and reasonable equivalents thereof.

I claim:

1. A template for measuring wall thickness or gauge of tubular members of different inner and outer diameters and wall thicknesses, comprising:

a generally rectangular elongated plate having a straight edge along one side edge of said plate and a generally V-shaped, open slot, said slot defining a first inclined edge spaced a predetermined distance from said one straight edge to define a tapered finger portion between said straight edge and said inclined edge extending the greater length of said plate and insertable within each of said tubular members to be measured, said slot tapering from a maximum width greater than the maximum wall thickness of any of said tubular members to be measured to a minimum width less than the minimum wall thickness of any of said tubular members to be measured, said first inclined edge having gauge measuring indicia at spaced intervals therealong, said indicia defining the width of said slot at that point.

2. A template according to claim 1, said slot having a second reference edge in spaced, substantially parallel relation to said straight edge.

3. A template according to claim 2, said template having flat opposed surfaces with English and metric units of measurement on said opposed surfaces, respectively, along one of said side edges.

4. A template according to claim 1, said template having opposite ends and opposite sides, said V-shaped slot extending in a lengthwise direction from one end of said template, and one of said opposite sides defining said one straight edge.

5. A template according to claim 1, said V-shaped slot having said first inclined edge and a second edge including gauge measuring indicia along one of said first and second edges and inch measuring indicia along the other of said first and second edges.

6. A template according to claim 1, said V-shaped slot having said inclined edge and said reference edge including gauge measuring indicia along one of said inclined and reference edges and inch measuring indicia along the other of said inclined and reference edges.

7. A template according to claim 6, said template having flat opposed surfaces with English and metric units of measurement on said opposed surfaces, respectively, along one of said side edges.

8. A template for measuring wall thickness or gauge of tubular members of different inner and outer diameters and wall thicknesses, comprising:

an elongated generally rectangular plate having a straight edge along one side and a single generally V-shaped, open slot therein, said slot including a reference edge in spaced, substantially parallel relation to said straight edge and an inclined edge spaced a predetermined distance between said one straight edge and said reference edge to define an elongated tapered finger portion between said straight edge and said inclined edge extending the greater length of said plate and insertable within each of said tubular members to be measured, said slot tapering from one end of said plate for the greater length of said plate and from a maximum width at the one end greater than the maximum wall thickness of any of the tubular members to be measured to a minimum width less than the minimum wall thickness of the tubular members to be measured, said finger portion being of a minimum width less than the smallest diameter of any of the tubular members to be measured, one of said inclined edge and said reference edge including gauge-measuring indicia at spaced intervals therealong.

9. A template according to claim 8, said template having opposite ends and opposite sides, said V-shaped slot extending in a lengthwise direction from one end of said template and terminating in a relief arc at its minimum width.

10. A template according to claim 9, said inclined edge having measuring indicia at spaced intervals therealong, each of said indicia defining the width of said slot at that point, and length measuring indicia along an opposite side edge of said plate.

\* \* \* \* \*